(12) United States Patent
Novotney et al.

(10) Patent No.: US 7,757,026 B2
(45) Date of Patent: *Jul. 13, 2010

(54) TECHNIQUES FOR TRANSFERRING STATUS INFORMATION BETWEEN AN ACCESSORY AND A MULTI-COMMUNICATION DEVICE

(75) Inventors: Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,416

(22) Filed: Aug. 3, 2009

(65) Prior Publication Data

US 2009/0292835 A1    Nov. 26, 2009

Related U.S. Application Data

(63) Continuation of application No. 12/209,970, filed on Sep. 12, 2008, now Pat. No. 7,587,540, which is a continuation of application No. 10/833,689, filed on Apr. 27, 2004, now Pat. No. 7,441,062.

(51) Int. Cl.
*G06F 13/42* (2006.01)
(52) U.S. Cl. .................... 710/105; 710/304; 710/64
(58) Field of Classification Search ......... 710/313–315, 710/110, 8–12, 62–64, 72–73, 16; 455/414.42, 455/556.1–556.2, 571–572
See application file for complete search history.

(56) References Cited

U.S. PATENT DOCUMENTS 4,673,861 A    6/1987 Dubovsky et al.

(Continued)

FOREIGN PATENT DOCUMENTS

EP    1104150 A2    5/2001

(Continued)

OTHER PUBLICATIONS

Altec Lansing, "inMOTION Users Guide," Corp. Headquarters, 535 Rte.6 & 209, Milford, PA 18337.

(Continued)

*Primary Examiner*—Raymond N Phan
(74) *Attorney, Agent, or Firm*—Townsend and Townsend and Crew LLP

(57) ABSTRACT

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The connector interface system also includes a remote connector which provides for the ability to output audio, input audio, provides I/O serial protocol, and to provide an output video. Embodiments of the present invention allow for a standard headphone cable to be plugged in but also for special remote control cables, microphone cables, video cables could be utilized in such a system. The connector interface system also includes a serial protocol to control device features. These controls help a user sort and search for data more efficiently within the device.

22 Claims, 5 Drawing Sheets

U.S. PATENT DOCUMENTS

| | | |
|---|---|---|
| 4,850,899 A | 7/1989 | Maynard |
| 4,916,334 A | 4/1990 | Minagawa et al. |
| 4,924,216 A | 5/1990 | Leung |
| 4,938,483 A | 7/1990 | Yavetz |
| 5,041,025 A | 8/1991 | Haitmanek |
| 5,055,069 A | 10/1991 | Townsend et al. |
| 5,080,603 A | 1/1992 | Mouissie |
| 5,104,243 A | 4/1992 | Harding |
| 5,108,313 A | 4/1992 | Adams |
| 5,150,031 A | 9/1992 | James et al. |
| 5,186,646 A | 2/1993 | Pederson |
| 5,247,138 A | 9/1993 | Landmeier |
| 5,277,624 A | 1/1994 | Champion |
| 5,471,128 A | 11/1995 | Patino et al. |
| 5,525,981 A | 6/1996 | Abernethy |
| 5,586,893 A | 12/1996 | Mosquera |
| 5,592,588 A | 1/1997 | Reekes et al. |
| 5,618,045 A | 4/1997 | Kagan et al. |
| 5,648,712 A | 7/1997 | Hahn |
| 5,660,558 A | 8/1997 | Osanai et al. |
| 5,727,866 A | 3/1998 | Kraines et al. |
| 5,732,361 A | 3/1998 | Liu |
| 5,754,027 A | 5/1998 | Oglesbee et al. |
| 5,830,001 A | 11/1998 | Kinoshita |
| 5,835,862 A | 11/1998 | Nykanen et al. |
| 5,845,217 A | 12/1998 | Lindell et al. |
| 5,859,522 A | 1/1999 | Theobald |
| 5,901,049 A | 5/1999 | Schmidt et al. |
| 5,964,847 A | 10/1999 | Booth, III et al. |
| 5,975,957 A | 11/1999 | Noda et al. |
| 6,007,372 A | 12/1999 | Wood |
| 6,012,105 A | 1/2000 | Rubbmark et al. |
| 6,031,797 A | 2/2000 | Van Ryzint et al. |
| 6,053,773 A | 4/2000 | Wu |
| 6,078,402 A | 6/2000 | Fischer et al. |
| 6,078,789 A | 6/2000 | Bodenmann et al. |
| 6,125,455 A | 9/2000 | Yeo |
| 6,130,518 A | 10/2000 | Gabehart et al. |
| 6,139,373 A | 10/2000 | Ward et al. |
| 6,154,773 A | 11/2000 | Roberts et al. |
| 6,154,798 A | 11/2000 | Lin et al. |
| 6,161,027 A | 12/2000 | Poirel |
| 6,169,387 B1 | 1/2001 | Kaib |
| 6,175,358 B1 | 1/2001 | Scott-Jackson et al. |
| 6,178,514 B1 | 1/2001 | Wood |
| 6,184,652 B1 | 2/2001 | Yang |
| 6,184,655 B1 | 2/2001 | Malackowski |
| 6,188,265 B1 | 2/2001 | Liu et al. |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,230,205 B1 | 5/2001 | Garrity et al. |
| 6,234,827 B1 | 5/2001 | Nishio et al. |
| 6,252,380 B1 | 6/2001 | Koenck |
| 6,261,109 B1 | 7/2001 | Liu et al. |
| 6,267,623 B1 | 7/2001 | Hisamatsu |
| 6,268,845 B1 | 7/2001 | Pariza et al. |
| 6,271,605 B1 | 8/2001 | Carkner et al. |
| 6,272,328 B1 | 8/2001 | Nguyen et al. |
| 6,280,251 B1 | 8/2001 | Nishio et al. |
| 6,283,789 B1 | 9/2001 | Tsai |
| 6,304,764 B1 | 10/2001 | Pan |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,372,974 B1 | 4/2002 | Gross et al. |
| 6,385,596 B1 | 5/2002 | Wiser et al. |
| 6,394,905 B1 | 5/2002 | Takeda et al. |
| 6,429,879 B1 | 8/2002 | Sturgeon et al. |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,505,160 B1 | 1/2003 | Levy et al. |
| 6,524,119 B2 | 2/2003 | Kato et al. |
| 6,526,287 B1 | 2/2003 | Lee |
| 6,558,201 B1 | 5/2003 | Begley et al. |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | DeLeeuw |
| 6,651,138 B2 | 11/2003 | Lai et al. |
| 6,653,813 B2 | 11/2003 | Khatri |
| 6,663,420 B1 | 12/2003 | Xiao |
| 6,665,803 B2 | 12/2003 | Lunsford et al. |
| 6,674,995 B1 | 1/2004 | Meyers et al. |
| 6,687,454 B1 | 2/2004 | Kuroiwa |
| 6,697,944 B1 | 2/2004 | Jones et al. |
| 6,724,339 B2 | 4/2004 | Conway et al. |
| 6,725,061 B1 | 4/2004 | Hutchison, IV et al. |
| 6,728,546 B1 | 4/2004 | Peterson et al. |
| 6,728,729 B1 | 4/2004 | Jawa et al. |
| 6,747,859 B2 | 6/2004 | Walbeck et al. |
| 6,754,468 B1 | 6/2004 | Sieben et al. |
| 6,761,635 B2 | 7/2004 | Hoshino et al. |
| 6,774,939 B1 | 8/2004 | Peng |
| 6,776,626 B2 | 8/2004 | Huang et al. |
| 6,776,660 B1 | 8/2004 | Kubota et al. |
| 6,776,665 B2 | 8/2004 | Huang |
| 6,799,226 B1 | 9/2004 | Robbin et al. |
| 6,801,964 B1 | 10/2004 | Mahdavi |
| 6,813,528 B1 | 11/2004 | Yang |
| 6,816,376 B2 | 11/2004 | Bright et al. |
| 6,830,160 B2 | 12/2004 | Risolia |
| 6,859,538 B1 | 2/2005 | Voltz |
| 6,859,854 B2 | 2/2005 | Kwong |
| 6,879,843 B1 | 4/2005 | Kim |
| 6,928,295 B2 | 8/2005 | Olson et al. |
| 6,931,266 B2 | 8/2005 | Miyoshi et al. |
| 6,931,456 B2 | 8/2005 | Payne et al. |
| 6,939,177 B2 | 9/2005 | Kato et al. |
| 6,991,483 B1 | 1/2006 | Milan et al. |
| 7,004,787 B2 | 2/2006 | Milan |
| 7,013,164 B2 | 3/2006 | Lin |
| 7,050,783 B2 | 5/2006 | Curtiss et al. |
| 7,054,888 B2 | 5/2006 | LaChapelle et al. |
| 7,062,261 B2 | 6/2006 | Goldstein et al. |
| 7,127,678 B2 | 10/2006 | Bhesania et al. |
| 7,127,879 B2 | 10/2006 | Zhu et al. |
| 7,108,560 B1 | 11/2006 | Chou et al. |
| 7,167,112 B2 | 1/2007 | Andersen et al. |
| 7,167,935 B2 | 1/2007 | Hellberg |
| 7,187,947 B1 | 3/2007 | White et al. |
| 7,187,948 B2 | 3/2007 | Alden |
| 7,215,042 B2 | 5/2007 | Yan |

| Patent/Publication | Date | Name |
|---|---|---|
| 7,281,214 B2 | 10/2007 | Fadell |
| 7,293,122 B1 | 11/2007 | Schubert et al. |
| 7,293,227 B2 | 11/2007 | Plastina et al. |
| 7,299,304 B2 | 11/2007 | Saint-Hilaire et al. |
| 7,303,282 B2 | 12/2007 | Dwyer et al. |
| 7,304,685 B2 | 12/2007 | Park et al. |
| 7,305,254 B2 | 12/2007 | Findikli |
| 7,305,506 B1 | 12/2007 | Lydon et al. |
| 7,362,963 B2 | 4/2008 | Lin |
| 7,415,563 B1 | 8/2008 | Holden et al. |
| 7,441,058 B1 | 10/2008 | Bolton et al. |
| 7,441,062 B2 | 10/2008 | Novotney et al. |
| 7,444,388 B1 | 10/2008 | Svendsen |
| 7,454,019 B2 | 11/2008 | Williams |
| 7,526,588 B1 | 4/2009 | Schubert et al. |
| 7,529,870 B1 | 5/2009 | Schubert et al. |
| 7,529,871 B1 | 5/2009 | Schubert et al. |
| 7,529,872 B1 | 5/2009 | Schubert et al. |
| 7,558,894 B1 | 7/2009 | Lydon et al. |
| 7,587,540 B2 * | 9/2009 | Novotney et al. ............ 710/105 |
| 7,590,783 B2 | 9/2009 | Lydon et al. |
| 7,634,605 B2 | 12/2009 | Laefer et al. |
| 7,660,929 B2 | 2/2010 | Novotney et al. |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0002035 A1 | 1/2002 | Sim et al. |
| 2002/0010759 A1 | 1/2002 | Hitson et al. |
| 2002/0025042 A1 | 2/2002 | Saito |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0108108 A1 | 8/2002 | Akaiwa et al. |
| 2002/0115480 A1 | 8/2002 | Huang |
| 2002/0116533 A1 | 8/2002 | Holliman et al. |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0173273 A1 | 11/2002 | Spurgat et al. |
| 2002/0174269 A1 | 11/2002 | Spurgat et al. |
| 2002/0194621 A1 | 12/2002 | Tran et al. |
| 2003/0004934 A1 | 1/2003 | Qian |
| 2003/0011608 A1 | 1/2003 | Wada |
| 2003/0028664 A1 | 2/2003 | Tan et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0090998 A1 | 5/2003 | Lee et al. |
| 2003/0097379 A1 | 5/2003 | Ireton |
| 2003/0110403 A1 | 6/2003 | Crutchfield et al. |
| 2003/0151621 A1 | 8/2003 | McEvilly et al. |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0220988 A1 | 11/2003 | Hymel |
| 2003/0236075 A1 | 12/2003 | Johnson et al. |
| 2003/0237043 A1 | 12/2003 | Novak et al. |
| 2004/0003300 A1 | 1/2004 | Malueg et al. |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0090998 A1 | 5/2004 | Chen |
| 2004/0103223 A1 | 5/2004 | Gabehart et al. |
| 2004/0116005 A1 | 6/2004 | Choi |
| 2004/0162029 A1 | 8/2004 | Grady |
| 2004/0164708 A1 | 8/2004 | Veselic et al. |
| 2004/0172533 A1 | 9/2004 | DeMello et al. |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0235339 A1 | 11/2004 | Sato et al. |
| 2004/0249994 A1 | 12/2004 | Shapiro et al. |
| 2004/0252966 A1 | 12/2004 | Holloway et al. |
| 2004/0267812 A1 | 12/2004 | Harris et al. |
| 2004/0267825 A1 | 12/2004 | Novak et al. |
| 2004/0268397 A1 | 12/2004 | Dunbar et al. |
| 2005/0014119 A1 | 1/2005 | Rudakov |
| 2005/0014531 A1 | 1/2005 | Findikli |
| 2005/0014536 A1 | 1/2005 | Grady |
| 2005/0015355 A1 | 1/2005 | Heller et al. |
| 2005/0022212 A1 | 1/2005 | Bowen |
| 2005/0047071 A1 | 3/2005 | Tse Chun Hin |
| 2005/0135790 A1 | 6/2005 | Hutten |
| 2005/0149213 A1 | 7/2005 | Guzak et al. |
| 2005/0181756 A1 | 8/2005 | Lin |
| 2005/0207726 A1 | 9/2005 | Chen |
| 2005/0227612 A1 | 10/2005 | Helstrom et al. |
| 2005/0239333 A1 | 10/2005 | Watanabe et al. |
| 2005/0240705 A1 | 10/2005 | Novotney et al. |
| 2005/0281185 A1 | 12/2005 | Kawasaki |
| 2006/0015826 A1 | 1/2006 | Shiozawa et al. |
| 2006/0031545 A1 | 2/2006 | Manders et al. |
| 2006/0056796 A1 | 3/2006 | Nishizawa et al. |
| 2006/0088228 A1 | 4/2006 | Marriott et al. |
| 2006/0156415 A1 | 7/2006 | Rubinstein et al. |
| 2006/0161621 A1 | 7/2006 | Rosenberg |
| 2006/0163358 A1 | 7/2006 | Biderman |
| 2006/0184456 A1 | 8/2006 | de Janasz |
| 2006/0188237 A1 | 8/2006 | Watanabe et al. |
| 2006/0224620 A1 | 10/2006 | Silverman et al. |
| 2006/0236245 A1 | 10/2006 | Agarwal et al. |
| 2006/0247851 A1 | 11/2006 | Morris |
| 2006/0258289 A1 | 11/2006 | Dua |
| 2006/0294209 A1 | 12/2006 | Rosenbloom et al. |
| 2007/0018947 A1 | 1/2007 | Toro-Lira |
| 2007/0056012 A1 | 3/2007 | Kwon et al. |
| 2007/0056013 A1 | 3/2007 | Duncan |
| 2007/0070856 A1 | 3/2007 | Tebele |
| 2007/0080823 A1 | 4/2007 | Fu et al. |
| 2007/0083750 A1 | 4/2007 | Miura et al. |
| 2007/0083814 A1 | 4/2007 | Wilbrink et al. |
| 2007/0086724 A1 | 4/2007 | Grady et al. |
| 2007/0106760 A1 | 5/2007 | Houh et al. |
| 2007/0173197 A1 | 7/2007 | Hsiung |
| 2007/0173294 A1 | 7/2007 | Hsiung |
| 2007/0206827 A1 | 9/2007 | Tupman et al. |
| 2007/0226384 A1 | 9/2007 | Robbin et al. |
| 2007/0233294 A1 | 10/2007 | Holden et al. |
| 2007/0233295 A1 | 10/2007 | Laefer et al. |
| 2007/0234420 A1 | 10/2007 | Novotney et al. |
| 2007/0236482 A1 | 10/2007 | Proctor et al. |
| 2007/0247794 A1 | 10/2007 | Jaffe et al. |
| 2008/0025172 A1 | 1/2008 | Holden et al. |
| 2009/0013096 A1 | 1/2009 | Novotney et al. |
| 2009/0013110 A1 | 1/2009 | Novotney et al. |
| 2009/0013253 A1 | 1/2009 | Laefer et al. |
| 2009/0125134 A1 | 5/2009 | Bolton et al. |
| 2009/0132076 A1 | 5/2009 | Holden et al. |
| 2009/0198361 A1 | 8/2009 | Schubert et al. |
| 2009/0204244 A1 | 8/2009 | Schubert et al. |
| 2009/0204738 A1 | 8/2009 | Schubert et al. |
| 2009/0210079 A1 | 8/2009 | Schubert et al. |
| 2009/0249101 A1 | 10/2009 | Lydon et al. |
| 2009/0299506 A1 | 12/2009 | Lydon et al. |

FOREIGN PATENT DOCUMENTS

| | | |
|---|---|---|
| EP | 1367734 A1 | 12/2003 |

| | | |
|---|---|---|
| EP | 1498899 A1 | 1/2005 |
| EP | 1594319 A1 | 11/2005 |
| EP | 1672613 A2 | 6/2006 |
| GB | 2405718 A | 3/2005 |
| JP | 07-176351 A | 7/1995 |
| JP | 10-321302 A | 4/1998 |
| JP | 10-334993 A | 12/1998 |
| JP | 11-288420 A | 10/1999 |
| JP | 2000-214953 A | 8/2000 |
| JP | 2000-223215 A | 8/2000 |
| JP | 2000-223216 A | 8/2000 |
| JP | 2000-223218 A | 8/2000 |
| JP | 2001-035603 A | 2/2001 |
| JP | 2001-069165 A | 3/2001 |
| JP | 2001-196133 A | 7/2001 |
| JP | 2001-230021 A | 8/2001 |
| JP | 2001-332350 A | 11/2001 |
| JP | 2002-025720 A | 1/2002 |
| JP | 2002-14304 A | 5/2002 |
| JP | 2002-203641 A | 7/2002 |
| JP | 2002 245719 A | 8/2002 |
| JP | 2002-252566 A | 9/2002 |
| JP | 3090747 U | 10/2002 |
| JP | 2002-342659 A | 11/2002 |
| JP | 2002-374447 A | 12/2002 |
| JP | 2003-017165 A | 1/2003 |
| JP | 2003-032351 A | 1/2003 |
| JP | 2003-058430 A | 2/2003 |
| JP | 2003-274386 A | 9/2003 |
| JP | 2004-078538 A | 3/2004 |
| JP | 2004-259280 A | 9/2004 |
| WO | WO 99/26330 | 5/1999 |
| WO | WO 00/39907 | 7/2000 |
| WO | WO 00/60450 A1 | 10/2000 |
| WO | WO 02/49314 A2 | 6/2002 |
| WO | WO 03/036541 A1 | 5/2003 |
| WO | WO 03/036957 A1 | 5/2003 |
| WO | WO 03/073688 | 9/2003 |
| WO | WO 2004/084413 A2 | 9/2004 |
| WO | WO 2004-095772 A1 | 11/2004 |
| WO | WO 2004/112311 A1 | 12/2004 |
| WO | WO 2005/119463 A2 | 12/2005 |
| WO | WO 2006/080957 A2 | 8/2006 |

OTHER PUBLICATIONS

Anonymous, "Future of Digital Music in Windows," Microsoft Windows Hardware Developer Central Archive, Dec. 4, 2001 [Online], [retrieved on Jan. 15, 2008]. <URL:http://www.microsoft.com/whdc/archive/digitaudio.mspx> 3 pages.

Anonymous, "Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx> 2 pages.

Anonymous, "Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> 2 pages.

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html p. 7.

Belkin iPod Voice Recorder, Product Specification Sheet, printed Jun. 16, 2004.

Bindra, "Standard Turns Monitor into I/O Hub," Electronic Engineering Times, vol. 918, Sep. 6, 1996, p. 14.

Brentrup, "Introduction to Public Key Cryptography Demystified," Campus Technology, printed from http://www.campus-technoloqy.com/article.asp?id=7626 on Oct. 6, 2004.

Brown, "Making UBS Work," downloaded Oct. 16, 2001, PC Magazine: PC Tech wysiwyg:/155/http://www.zdnet.com/pcmag/pctech/content!18/04/tu1804.001.html.

"Cables to Go," download Oct. 16, 2001 http://www.cablestogo.com/product.asp?cat%5Fid=601&sku=27028.

Crawford et al., "Sample rate conversion and bit rate reduction in the studio," IEEE Colloquium on Digital Audio Signal Processing, May 22, 1991, pp. 8/1-8/3.

Derman, "Monitors Make Net Connections," Electronic Engineering Times, vol. 933, 1996, pp. 60 and 69.

"ExpressBus™ F5U0I0," User Guide Packing Checklist, Belkin Components Product Warranty.

"FireWire", downloaded Oct. 16, 2001, si_wyg:/_/4_2/http://developer.apple._com|hardware|Fire_Wire.

"Fire Wire Connector," downloaded Oct. 16, 2001, wysiwyg://76/http://developer.apple.com/...es/Macintosh_CPUs-G3/ibook/ibook-27.html.

Fried, "FireWire poised to become ubiquitous," downloaded Oct. 16, 2001, CNET News.com, 1394 Trade Association: Press, wysiwyg:/132/http:/_113_94ta.orq/Press/200_1Press/august!8.2_7._b.html.

Fried, "New Fire Wire to blaze faster trail," downloaded Oct. 16, 2001, CNET News.com, http://news.cnet.com/news/0-I006-200-6021210.html.

"How to Connect Your Computer PC Hardware", downloaded Oct. 16, 2001, http:///www.scar.utoronto.ca!~ccweb/faculty/connect-howto.html.

"IEEE 1394/USB Comparison," downloaded Oct. 16, 2001, www.genitech.com.auILIBRARY/TechSupportiinfobits/firewirevsusb.html.

"Introduction to Public Key Cryptography," Oct. 9, 1998, printed from http://developer.netscape.com/docs/manuals/security/pkin/contents.html on Oct. 6, 2004.

iPod Classic User's Guide, acquired from apple.com, 2002; 44 pages.

iPod nano Features Guide, acquired from apple.com, 2008; 72 pages.

iPod touch User's Guide, acquired from apple.com, 2008, 120 pages.

"iPodDock/iPod Cradle," www.bookendzdocks.com/bookendz/dock_cradle.html, downloaded Feb. 27, 2003.

Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10.

Lewis, "On Technology" Fortune Magazine, Dec. 9, 2002, p. 240.

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

Menezes et al., "Handbook of Applied Cryptography," Identification and Entity Authentication, pp. 385-424.

Microsoft, "Media Transport Protocol Implementation Details," 2005, 18 pages.

"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document, 70 pages.

Networking Tech Note, "1394 Standards and Specifications," 3 pgs.

"Neuros MP3 Digital Audio Computer," www.neurosaudio.com, downloaded Apr. 9, 2003, 6 pages.

"PMC FW2 IEEE1394 FireWire Controller", downloaded Oct. 16, 2001, http://www.bvmltd.co.uk/PMCfw2ds.html.

Severance, "FireWire Finally Comes Home," Michigan State University, Standards, Nov. 1998, pp. 117-118.

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

Teener, "Understanding Fire Wire: The IEEE 1394 Standards and Specifications," downloaded Oct. 16, 2001 wysiwyg:119/http:1_Iwww.chipcentercom/networking/ieee1394/main.html.

"The Authoritative Dictionary of IEEE Standards Terms, Seventh Edition," Published by Standards Information Network, IEEE Press, 2000, 3 pages.

"Universal Serial Bus Specification—Rev 2.0," Chapter 6, Compaq Hewlett-Packard, Apr. 27, 2000, pp. 85, 99-100.

"Universal Serial Bus Specification—Rev 2.0," XP002474828, Chapter 9, USB Device Framework, pp. 239-274.

Vitaliano, "Why FireWire is Hot!Hot!Hot!" downloaded Oct. 16, 2001, "Impact.FireWire.SideBar" http://www.vxm.com/21R.35.html.

Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm, 8 pages.

U.S. Appl. No. 12/610,966, filed Nov. 2, 2009, Laefer et al.

* cited by examiner 3.1 CONNECTOR PIN DESIGNATIONS:
3.1.1 OMNI: JAE DDI 30 pin connector series

| Pin | Signal name | I/O | Function |
|---|---|---|---|
| 1 | F/W GND | I | Firewire and charger ground |
| 2 | F/W GND | I | Firewire and charger ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | 0 | 3.3V output from iPod. Current limited to 100mA. |
| 14 | Reserved | | |
| 15 | USB GND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | 0 | Serial protocol (Data from iPod) |
| 20 | Accessory Detect | I/O | |
| 21 | Reserved | | |

| 22 | Reserved | | |
|---|---|---|---|
| 23 | Reserved | | |
| 24 | Reserved | | |
| 25 | LINE-IN L | I | Line level input to the iPod for the left channel |
| 26 | LINE-IN R | I | Line level input to the iPod for the right channel |
| 27 | LINE-OUT L | 0 | Line level output to the iPod for the left channel |
| 28 | LINE-OUT R | 0 | Line level output to the iPod for the right channel |
| 29 | Audio Return | GND | Audio return - Singal, never to be grounded inside accessory |
| 30 | DGND | GND | Digital ground iPod |
| 31 | Chassis | | Chassis ground for connector shell |
| 32 | Chassis | | Chassis ground for connector shell |

FIG.3A 3.1.2 AUDIO/REMOTE: 8 pin Foxconn Apple Custom

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Reserved | | |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG.3B

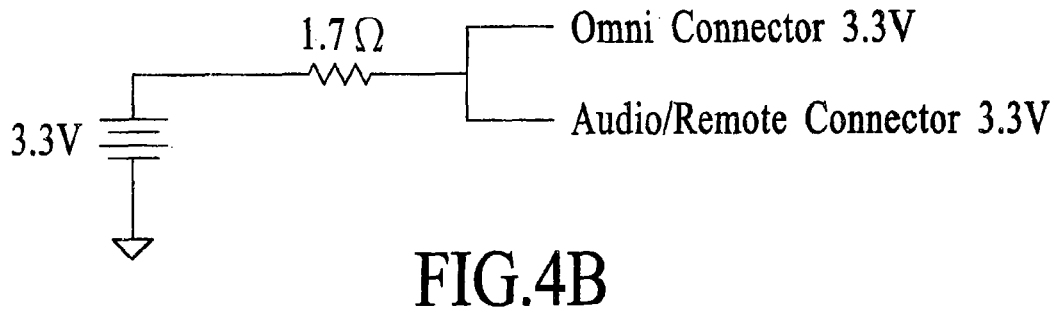

FIG.4B

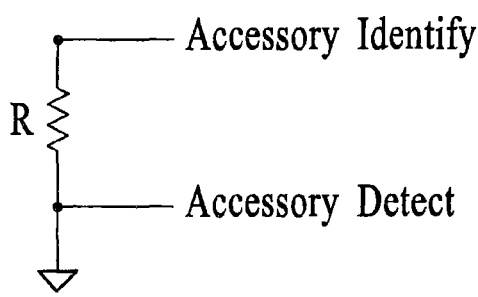

FIG.4C

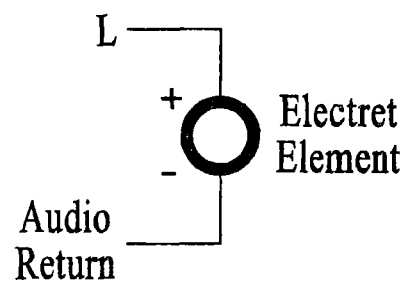

FIG.4D

TECHNIQUES FOR TRANSFERRING STATUS INFORMATION BETWEEN AN ACCESSORY AND A MULTI-COMMUNICATION DEVICE

CROSS-REFERENCES TO RELATED APPLICATIONS

The present application claims priority from and is a continuation of U.S. Non-Provisional application Ser. No. 12/209,970, filed Sep. 12, 2008, now U.S. Pat. No. 7,587,540, issued Sep. 8, 2009, entitled "TECHNIQUES FOR TRANSFERRING STATUS INFORMATION BETWEEN AN ACCESSORY AND A MULTI-COMMUNICATION DEVICE," the entire contents of which are incorporated herein by reference in its entirety for all purposes.

U.S. Non-Provisional application Ser. No. 12/209,970 which is a continuation of U.S. Non-Provisional application Ser. No. 10/833,689, filed Apr. 27, 2004, now U.S. Pat. No. 7,441,062, issued Oct. 21, 2008, entitled "CONNECTOR INTERFACE SYSTEM FOR ENABLING DATA COMMUNICATION WITH A MULTI-COMMUNICATION DEVICE," the entire contents of which are incorporated herein by reference in its entirety for all purposes.

The contents of the following related applications are herein incorporated by reference in their entirety for all purposes:

(1) U.S. application Ser. No. 12/209,962 entitled "CONNECTOR INTERFACE SYSTEM FOR A MULTI-COMMUNICATION DEVICE" filed Sep. 12, 2008 (U.S. Publication No. 2009/0006700, published Jan. 1, 2009), now U.S. Pat. No. 7,660,929, issued Feb. 9, 2010;

(2) U.S. application Ser. No. 12/210,022 entitled "CONNECTOR INTERFACE SYSTEM FOR ENABLING DATA COMMUNICATION WITH A MULTI-COMMUNICATION DEVICE" filed Sep. 12, 2008 (U.S. Publication No. 2009/0013110, published Jan. 8, 2009); and (3) U.S. application Ser. No. 12/209,993 entitled "TECHNIQUES FOR TRANSFERRING INFORMATION BETWEEN AN ACCESSORY AND A MULTI-COMMUNICATION DEVICE" filed Sep. 12, 2008 (U.S. Publication No. 2009/0013096, published Jan. 8, 2009.

FIELD OF THE INVENTION

The present invention relates generally to multi-communication devices and more particularly to a connector interface system for such devices.

BACKGROUND OF THE INVENTION

Multi-communication devices are utilized in a variety of environments. What is meant by a multi-communication device is a device such as MP3 player, or other type of device that receives video, audio, and a variety of other digital data and can provide an output of the data. As these devices proliferate, a connector interface specification becomes more important, and also insuring that a particular multi-communications device interfaces appropriately with the appropriate external devices becomes more important.

In a typical connector interface, there is a docking connector that allows for the docking of the multi-communications device to a docking station for another type of communication for the device. A multi-communication device also typically includes a remote connector with the ability to output audio. As more multi-media content becomes available (i.e., digital video graphics, etc.) it is desirable to have a multi-media device which can effectively input and output such data.

Finally, such an interface typically has some sort of protocol to control device features from an external device and it also is desirable for the protocol to help the user sort and search for data faster and in an efficient manner. Heretofore, there is no device that includes features that overcome many of the above-stated problems. What is desired is a connector interface system which is utilized in such a device to address all the above-identified issues. The present invention addresses such a need.

SUMMARY OF THE INVENTION

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The connector interface system also includes a remote connector which provides for the ability to output audio, input audio, and output video using an I/O serial protocol. Heretofore, all these features have not been implemented in a connector. Therefore, this would allow for a standard headphone cable to be plugged in but also for special remote control cables, microphone cables, video cables to be utilized in such a system. The connector interface system also includes a serial protocol to control device features. These controls help a user sort and search for data more efficiently within the device.

BRIEF DESCRIPTION OF THE DRAWINGS

FIG. 3A illustrates the connection pin designations for the docking connector.

FIG. 3B illustrates the connection pin designations for the remote connector.

FIG. 4B illustrates the USB connector interface.

FIG. 4C illustrates a reference schematic diagram for accessory detect and identify system for detecting and identifying accessories for the docking connector.

FIG. 4D is a reference schematic of an electret microphone that is within the remote connector.

DETAILED DESCRIPTION

The present invention relates generally to multi-communication devices and more particularly to a connector interface system for such devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Connector System Overview

To describe the features of the connector system in accordance with the present invention in more detail, refer now to the following description in conjunction with the accompanying drawings.

Docking Connector

Figure 1A:
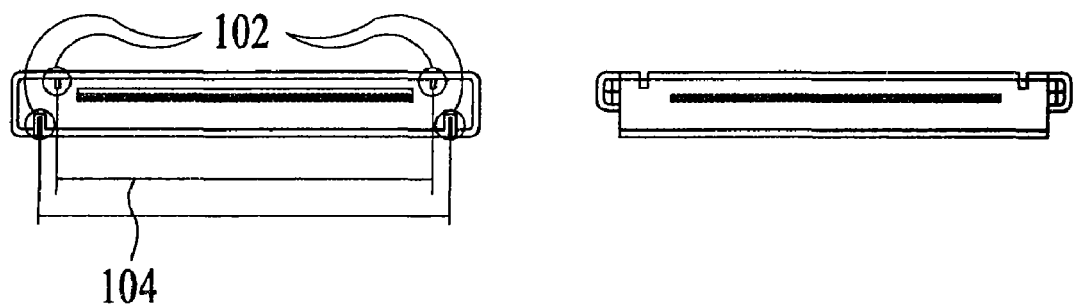
FIGS. 1A and 1B illustrate a docking connector in accordance with the present invention.
Figure 1B:
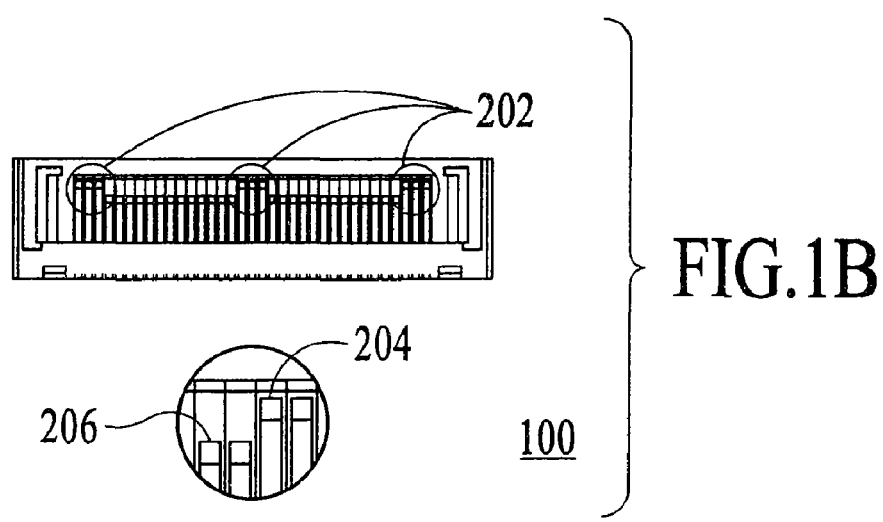

FIGS. 1A and 1B illustrate a docking connector 100 in accordance with the present invention. Referring first to FIG. 1A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first mate/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote systems and devices can interface with the multi-communication device.

Remote Connector

Figure 2A:
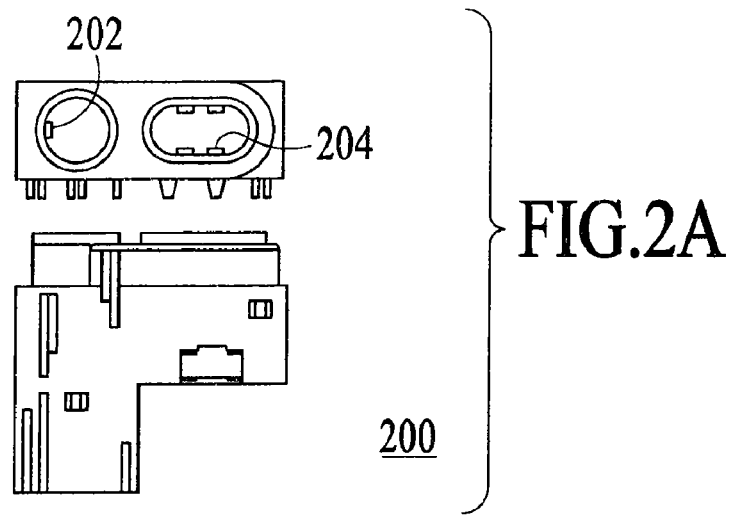
FIGS. 2A-2C illustrate the remote connector in accordance with the present invention.
Figure 2B:
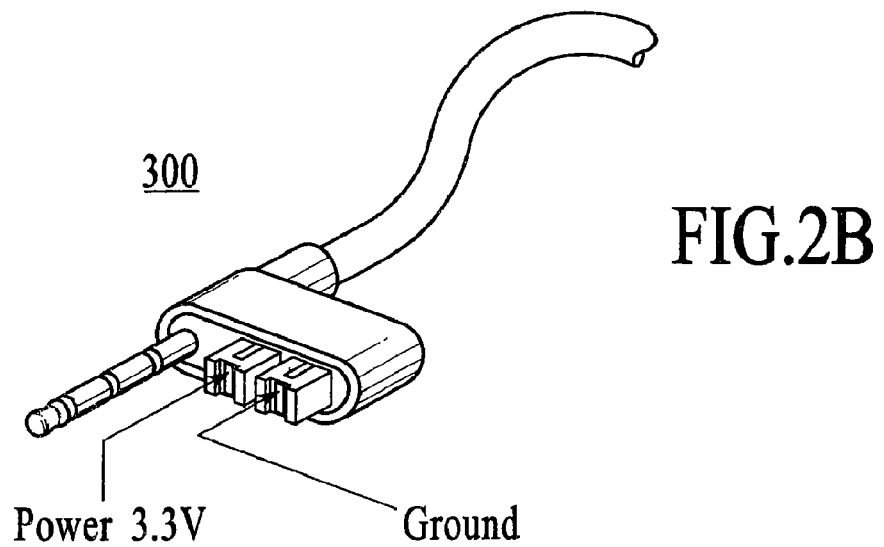
Figure 2C:
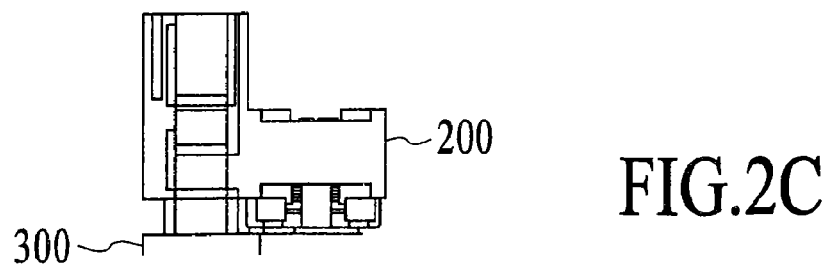

The connection interface system also includes a remote connector which provides for the ability to output audio, input audio, and output video using an I/O serial protocol. FIG. 2A is a front and top view of a remote connector 200 in accordance with the present invention. As is seen, the remote connector 200 includes a top headphone receptacle 202, as well as, a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables, video cables could be utilized with the remote connector.

Serial Protocol

The connector interface system also includes a serial protocol. The protocol is utilized to allow external devices to control the multi-communication device. These controls help a user sort and display for data more efficiently utilizing the device. A representation list of controls includes, but are not limited to:

Next album
Previous album
Next chapter
Previous chapter
Next play list
Previous play list
Shuffle setting advance
Repeat setting advance
Backlight for 30 seconds
Begin fast forward
Begin rewind To describe the features of the connector interface system in more detail, please find below a functional description of the docking connector, remote connector and a serial protocol in accordance with the present invention.

Docking and Remote Connector Specifications

For an example of the connector pin designations for both the docking connector and for the remote connector for a multi-communication device such as an iPod device by Apple Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
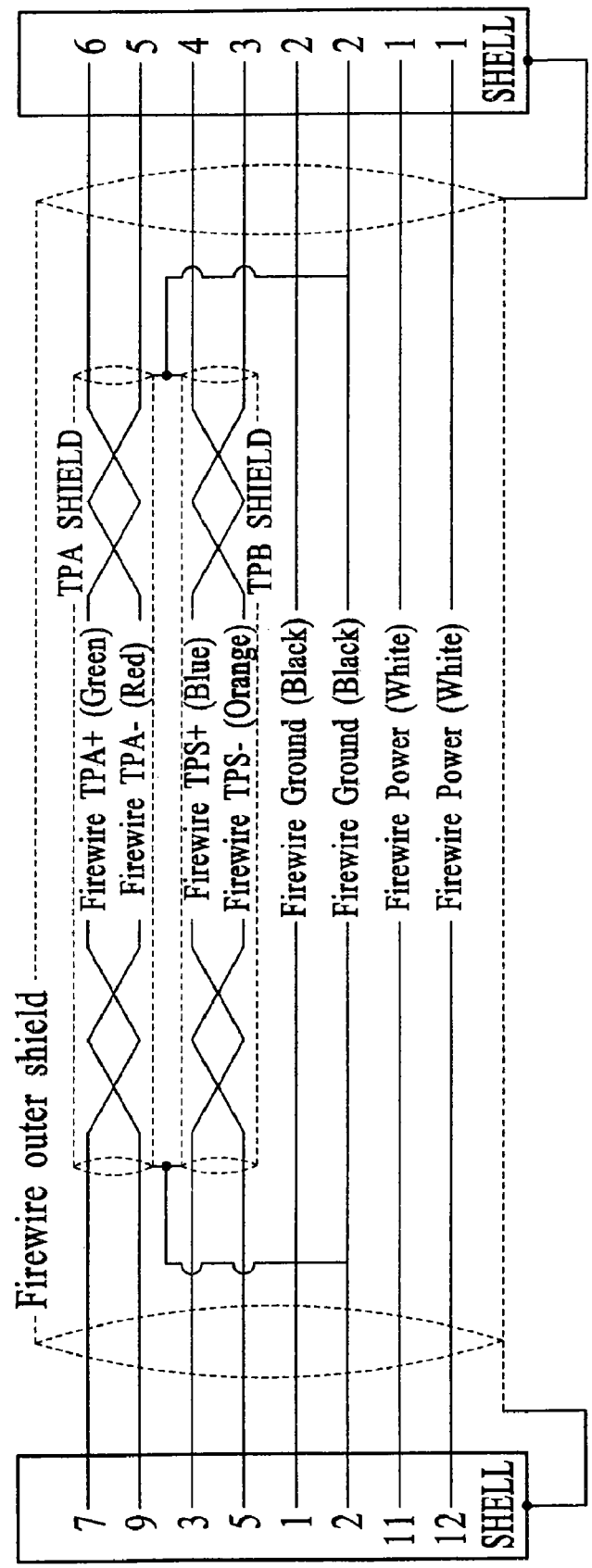
FIG. 4A illustrates the Firewire connector interface.

FIG. 4A illustrates a typical FireWire connector interface for the docking connector:
  FireWire Power:
  a) 8V-30V DC IN
  b) 10 W Max
  FireWire:
  a) Designed to IEEE 1394 A Spec (400 Mb/s)
  FIG. 4B illustrates the USB connector interface.
  USB 2.0:
  a) Designed to USB 2.0 High Speed Spec
  b) The USB Power (pin 8 on the 30-pin connector) is not used for powering device; only used to detect a USB host connection.

FIG. 4C illustrates a reference schematic diagram for accessory detect and identify system for detecting and identifying accessories for the docking connector. The system comprises:
  a) A simple resistor to ground allows the device to determine what has been plugged into docking connector. There is an internal pullup on Accessory Identify.
  b) Two pins required (Accessory Identify & Accessory Detect)
  Serial Protocol Communication:
  a) Two pins are used to communicate to and from device (Rx & Tx)
  b) Input & Output (0V=Low; 3.3V=High)
  c) A device with an identity resistor (ID #13) is a serial dock accessory.

A device coupled to the docking connector allows for a standard serial protocol to be utilized. Attaching a serial dock accessory makes any top-attached (remote connector) accessories inactive.
  Line Level Input (Left & Right):
  a) Stereo audio input b) Input Level 1V RMS (max)
  a) Chassis ground is tied to specified pins
  b) Digital ground should not be tied to Audio Return Remote Connector Specifications
  Audio Out:
  a) Stereo Output per channel volume controlled by device
  Mono Mic In:
  a) Mono mic in through Left channel
  b) Filtered electret power supplied by internal device
  FIG. 4D is a reference schematic of an electret microphone that is within the remote connector.
  Serial Protocol Communication:
  a) Two pins used to communicate to and from device (Rx & Tx)
  b) Input & Output (0V=Low, 3.3V=High)

Serial Protocol

Protocol Generalities

As previously mentioned, another feature of the present invention is the use of a serial protocol for allowing features to be implemented for remote devices. In a preferred embodiment, the protocol builds upon a signaling protocol, such as the RS-232 serial specification. However, the signaling levels are nonstandard. In true RS-232, a mark is −7V and a space is 7V. In this protocol, a mark is 3.3V and a space is 0V. The signaling rate for this protocol is 19,200 bps. All signaling is at 8 bits data, no parity and one stop bit (8-N-1).

This protocol is to be used in both directions of a link. Every device is encouraged to implement both sending and receiving capabilities. It is be possible to determine the direction (host to device or device to host) of a packet from its contents only. This means that no packet is valid for sending from both the host and device.

All devices must be able to handle variable-length packets. For example, even though an identify packet currently has no defined data, a device must be able to understand an identify packet with data and should respond to the best of its ability. It must at least not lose sync to the packet signaling.

Lingo Specifications

| Lingo | ID |
| --- | --- |
| General | 0x00 |
| Microphone | 0x01 |
| Simple Remote | 0x02 |
| Display Remote | 0x03 |
| RF transmitter | 0x05 |

The general lingo is shared for housekeeping commands across all devices. The microphone lingo is used by the remote connector on the multi-communication device. The simple remote lingo is used by a standard in-line remote control. The display remote lingo is reserved for a device with similar functionality to the standard remote but with a display for status.

General Lingo Specification

| Command | ID | Data Length |
| --- | --- | --- |
| Request identify | 0x00 | 0x00 |
| Identify | 0x01 | 0x01+ |

The host may send a request identify to the device to ask the device to reidentify itself.

The device sends an identify packet to identify itself. At this time multifunction (combo) devices are not supported. The identify data payload is thus the command ID 0x01 followed by a single byte of the same value as the lingo specification of the functionality the device implements unless specified otherwise. The identify packet returned in response to a request identify packet does not need to have the extra sync bytes and delays used during the startup process.

Simple Remote Lingo Specification

| Command | ID | Data Length |
| --- | --- | --- |
| Buttons status | 0x00 | 0x00+ |

A simple remote device sends a buttons status command to indicate an updated status of which buttons are held down. The data of the packet is a number of bytes indicating which buttons are currently held down. The bytes are made up by ORing the masks of the buttons together. The device will send a 0x00 in data (or no data) to indicate all buttons are released. While any buttons are held down the device should repeat this packet on a predetermined interval. If no packet of this sort is received by the host for 200 ms the host may assume a packet was lost and go to "all buttons up" mode.

A representative simple remote button map is shown below:

Simple Remote Button Map

| Button | Number | Byte No, Mask |
| --- | --- | --- |
| Play/Pause | 0 | 0, 0x01 |
| Volume Up | 1 | 0, 0x02 |
| Volume Down | 2 | 0, 0x04 |
| Next Track | 3 | 0, 0x08 |
| Previous Track | 4 | 0, 0x10 |
| Next Album | 5 | 0, 0x20 |
| Previous Album | 6 | 0, 0x40 |
| Stop | 7 | 0, 0x80 |
| Play/Resume | 8 | 1, 0x01 |
| Pause | 9 | 1, 0x02 |
| Mute toggle | 10 | 1, 0x04 |
| Next Chapter | 11 | 1, 0x08 |
| Previous Chapter | 12 | 1, 0x10 |
| Next Playlist | 13 | 1, 0x20 |
| Previous Playlist | 14 | 1, 0x40 |
| Shuffle setting advance | 15 | 1, 0x80 |
| Repeat setting advance | 16 | 2, 0x01 |
| Power On | 17 | 2, 0x02 |
| Power Off | 18 | 2, 0x04 |
| Backlight for 30 seconds | 19 | 2, 0x08 |
| Begin FF | 20 | 2, 0x10 |
| Begin REW | 22 | 2, 0x20 |

The use of the button remote map allows for features that heretofore have not been utilized in multi-communication devices such as an iPod device manufactured by Apple Inc.

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The remote connector provides for the ability to output audio, input audio, and output video using an I/O serial protocol. The connector interface also includes a serial protocol to control device features. These controls help a user sort and search for data more efficiently within the device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for operating a multi-communication device communicatively coupled with an accessory, the method comprising:
   detecting, by the accessory, an event corresponding to a user activating at least one of a plurality of controls of the accessory, the plurality of controls including a play/pause control, a volume up control, and a volume down control; and
   transmitting, by the accessory to the multi-communication device, a status bitmask comprising a plurality of status bits, each status bit being associated with a control in the plurality of controls,
   wherein the play/pause, volume up, and volume down controls are associated with status bits in a lowest-order byte of the status bitmask.

2. The method of claim 1 wherein the plurality of controls further include a next track control, a previous track control, a next album control, a previous album control, and a stop control, and
   wherein the next track, previous track, next, album, previous album, and stop controls are also associated with status bits in the lowest-order byte.

3. The method of claim 2 wherein the status bits associated with the play/pause, volume up, and volume down controls precede the status bits associated with the next track, previous track, next, album, previous album, and stop controls in the lowest-order byte.

4. The method of claim 2 wherein the plurality of controls further include a play/resume control, a pause control, and a mute toggle control, and
   wherein the play/resume, pause, and mute toggle controls are associated with status bits in a second lowest-order byte of the status bitmask.

5. The method of claim 4 wherein the plurality of controls further include a next chapter control, a previous chapter control, a next playlist control, a previous playlist control, and a shuffle setting advance control, and
   wherein the next chapter, previous chapter, next playlist, previous playlist, and shuffle setting advance controls are also associated with status bits in the second lowest-order byte.

6. The method of claim 5 wherein the status bits associated with the play/resume, pause, and mute toggle controls precede the status bits associated with the next chapter, previous chapter, next playlist, previous playlist, and shuffle setting advance controls in the second lowest-order byte.

7. The method of claim 5 wherein the plurality of controls further include a repeat setting advance control, a power on control, and a power off control, and
   wherein the repeat setting advance, power on, and power off controls are associated with status bits in a third lowest-order byte of the status bitmask.

8. The method of claim 7 wherein the plurality of controls further include a backlight control, a begin fast-forward control, and a begin rewind control, and
   wherein the backlight, begin fast-forward, and begin rewind controls are also associated with status bits in the third lowest-order byte.

9. The method of claim 8 wherein the status bits associated with the repeat setting advance, power on, and power off controls precede the status bits associated with the backlight, begin fast-forward, and begin rewind controls in the third lowest-order byte.

10. The method of claim 1 further comprising:
    detecting, by the accessory, when the at least one control is no longer activated; and
    transmitting, by the accessory to the multi-communication device, another status bitmask, wherein each status bit in the another status bit mask is set to a state indicating that its associated control is not activated.

11. The method of claim 1 wherein the accessory is configured to continuously transmit the status bitmask to the multi-communication device at a predetermined interval while the at least one control remains activated.

12. An accessory capable of being communicatively coupled with a multi-communication device, the accessory comprising:
    a plurality of controls; and
    a control component configured to:
      detect an event corresponding to a user activating at least one of a plurality of controls of the accessory, the plurality of controls including a play/pause control, a volume up control, and a volume down control; and
      transmit to the multi-communication device a status bitmask comprising a plurality of status bits, each status bit being associated with a control in the plurality of controls,
    wherein the play/pause, volume up, and volume down controls are associated with status bits in a lowest-order byte of the status bitmask.

13. The accessory of claim 12 wherein the plurality of controls further include a next track control, a previous track control, a next album control, a previous album control, and a stop control, and
    wherein the next track, previous track, next, album, previous album, and stop controls are also associated with status bits in the lowest-order byte.

14. The accessory of claim 13 wherein the status bits associated with the play/pause, volume up, and volume down controls precede the status bits associated with the next track, previous track, next, album, previous album, and stop controls in the lowest-order byte.

15. The accessory of claim 12 wherein the status bitmask is transmitted via a connector of the accessory, and wherein the connector includes:
    a plurality of pins configured to mate with a corresponding plurality of pins of a connector of the multi-communication device; and
    an accessory-identifying resistor connected between two of the plurality of pins.

16. A method for operating an accessory communicatively coupled with a multi-communication device, the method comprising:
    detecting, by the multi-communication device, an event corresponding to a user activating at least one of a plurality of controls of the multi-communication device, the plurality of controls including a play/pause control, a volume up control, and a volume down control; and
    transmitting, by the multi-communication device to the accessory, a status bitmask comprising a plurality of status bits, each status bit being associated with a control in the plurality of controls,
    wherein the play/pause, volume up, and volume down controls are associated with status bits in a lowest-order byte of the status bitmask.

17. The method of claim 16 wherein the plurality of controls further include a next track control, a previous track control, a next album control, a previous album control, and a stop control, and wherein the next track, previous track, next, album, previous album, and stop controls are also associated with status bits in the lowest-order byte.

18. The method of claim 17 wherein the status bits associated with the play/pause, volume up, and volume down controls precede the status bits associated with the next track, previous track, next, album, previous album, and stop controls in the lowest-order byte.

19. A multi-communication device capable of being communicatively coupled with an accessory, the multi-communication device comprising:
a plurality of controls; and
a control component configured to:
    detect an event corresponding to a user activating at least one of a plurality of controls of the multi-communication device, the plurality of controls including a play/pause control, a volume up control, and a volume down control; and
    transmit to the accessory a status bitmask comprising a plurality of status bits, each status bit being associated with a control in the plurality of controls, wherein the play/pause, volume up, and volume down controls are associated with status bits in a lowest-order byte of the status bitmask.

20. The multi-communication device of claim 19 wherein the plurality of controls further include a next track control, a previous track control, a next album control, a previous album control, and a stop control, and
wherein the next track, previous track, next, album, previous album, and stop controls are also associated with status bits in the lowest-order byte.

21. The multi-communication device of claim 20 wherein the status bits associated with the play/pause, volume up, and volume down controls precede the status bits associated with the next track, previous track, next, album, previous album, and stop controls in the lowest-order byte.

22. The multi-communication device of claim 19 wherein the status bitmask is transmitted via a connector of the multi-communication device, and wherein the connector includes:
a plurality of pins configured to mate with a corresponding plurality of pins of a connector of the accessory; and
an accessory-identifying resistor connected between two of the plurality of pins.

* * * * *

UNITED STATES PATENT AND TRADEMARK OFFICE
CERTIFICATE OF CORRECTION

| | | |
|---|---|---|
| PATENT NO. | : 7,757,026 B2 | Page 1 of 1 |
| APPLICATION NO. | : 12/534416 | |
| DATED | : July 13, 2010 | |
| INVENTOR(S) | : Donald J. Novotney et al. | |

It is certified that error appears in the above-identified patent and that said Letters Patent is hereby corrected as shown below:

On page 2, in column 1, under "U.S. Patent Documents", line 33, delete "Van Ryzint et al." and insert -- Van Ryzin et al. --, therefor.

On page 2, in column 2, under "U.S. Patent Documents", line 66, delete "11/2006" and insert -- 9/2006 --, therefor.

On Sheet 3 of 5, in Figure 3A, line 29, delete "Singal," and insert -- Signal, --, therefor.

In column 7, line 24, in Claim 2, delete "next, album," and insert -- next album, --, therefor.

In column 7, line 30, in Claim 3, delete "next, album," and insert -- next album, --, therefor.

In column 8, line 33, in Claim 13, delete "next, album," and insert -- next album, --, therefor.

In column 8, line 39, in Claim 14, delete "next, album," and insert -- next album, --, therefor.

In column 9, line 1, in Claim 17, delete "next, album," and insert -- next album, --, therefor.

In column 9, line 8, in Claim 18, delete "next, album," and insert -- next album, --, therefor.

In column 10, line 8, in Claim 20, delete "next, album," and insert -- next album, --, therefor.

In column 10, line 14, in Claim 21, delete "next, album," and insert -- next album, --, therefor.

Signed and Sealed this
Fifteenth Day of November, 2011

David J. Kappos
*Director of the United States Patent and Trademark Office*